United States Patent
Song et al.

(10) Patent No.: US 11,842,274 B2
(45) Date of Patent: Dec. 12, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Gilwoo Song, Suwon-si (KR); Jaehyun Kwon, Suwon-si (KR); Jinwoo Nam, Suwon-si (KR); Heeseung Shin, Suwon-si (KR); Minseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 339 days.

(21) Appl. No.: 17/140,706

(22) Filed: Jan. 4, 2021

(65) Prior Publication Data
US 2021/0209374 A1  Jul. 8, 2021

(30) Foreign Application Priority Data

Jan. 7, 2020 (KR) .......................... 10-2020-0002257

(51) Int. Cl.
*G06N 3/00* (2023.01)
*G06N 3/08* (2023.01)
(Continued)

(52) U.S. Cl.
CPC ............... *G06N 3/08* (2013.01); *G06F 18/22* (2023.01); *G06N 3/045* (2023.01); *G06V 10/22* (2022.01);
(Continued)

(58) Field of Classification Search
CPC .......... G06N 3/08; G06N 3/045; G06N 20/00; G06N 3/044; G06N 3/047; G06N 20/10;
(Continued)

(56) References Cited

U.S. PATENT DOCUMENTS 6,862,369 B2  3/2005  Kondo
8,184,850 B2  5/2012  Shi et al.
(Continued)

FOREIGN PATENT DOCUMENTS

CN  104954807 A  *  9/2015
JP  4612760 B2     1/2011
(Continued)

OTHER PUBLICATIONS

Nguyen et al., Deep Learning for Deepfakes Creation and Detection, arXiv:1909.11573v1 (Year: 2019).*
(Continued)

*Primary Examiner* — Nay A Maung
*Assistant Examiner* — Xiao Liu
(74) *Attorney, Agent, or Firm* — Sughrue Mion, PLLC

(57) ABSTRACT

A controlling method of an electronic apparatus may include: obtaining image data and metadata regarding the image data, the image data comprising a first image frame and a second image frame that is subsequent to the first image frame; obtaining information regarding a region of interest of the first image frame by inputting the first image frame to a first neural network model; obtaining a similarity between the first image frame and the second image frame based on motion vector information included in the metadata; and detecting whether there is a manipulated area in the second image frame based on the similarity.

12 Claims, 12 Drawing Sheets

(51) Int. Cl.
*G06V 20/40* (2022.01)
*G06F 18/22* (2023.01)
*G06N 3/045* (2023.01)
*G06V 10/22* (2022.01)
*G06V 10/25* (2022.01)
*G06V 10/75* (2022.01)

(52) U.S. Cl.
CPC .............. *G06V 20/41* (2022.01); *G06V 20/46* (2022.01); *G06V 10/25* (2022.01); *G06V 10/751* (2022.01)

(58) Field of Classification Search
CPC ... G06N 3/0464; G06F 18/22; G06F 18/2415; G06F 30/27; G06F 18/24; G06F 40/216; G06V 10/22; G06V 20/46; G06V 10/764; G06V 10/25; G06V 10/82; G06V 20/41; G06V 10/761; G06V 20/698; G06V 20/48; G06V 10/759; G06T 2207/20081; G06T 7/11; G06T 2207/30201; G06T 2207/20084; G06T 2207/10016; G06T 7/174; G06T 2207/20104; G06T 7/248
See application file for complete search history.

(56) References Cited

U.S. PATENT DOCUMENTS

| | | | |
|---|---|---|---|
| 8,689,016 | B2 | 4/2014 | Morten et al. |
| 9,342,725 | B2 | 5/2016 | Vieta et al. |
| 9,560,271 | B2 | 1/2017 | Na et al. |
| 9,584,807 | B2 | 2/2017 | Kim et al. |
| 9,824,280 | B2 | 11/2017 | Li |
| 9,881,209 | B2 | 1/2018 | Budihal et al. |
| 10,332,243 | B2 | 6/2019 | Berge et al. |
| 10,824,942 | B1 * | 11/2020 | Bhotika ............... G06N 3/08 |
| 11,429,658 | B1 * | 8/2022 | Richter ............... G06F 16/483 |
| 11,580,203 | B2 * | 2/2023 | Chen .................. G06V 40/161 |
| 2009/0025039 | A1 | 1/2009 | Bronstein et al. |
| 2015/0371090 | A1 * | 12/2015 | Miyasako ............ H04N 5/772 386/241 |
| 2018/0101751 | A1 | 4/2018 | Ghosh et al. |
| 2018/0114067 | A1 | 4/2018 | Kwon et al. |
| 2019/0362155 | A1 * | 11/2019 | Croxford ............ G06F 18/2413 |
| 2020/0120332 | A1 * | 4/2020 | Julve .................. H04N 23/56 |
| 2021/0117690 | A1 * | 4/2021 | Ye ...................... G10L 25/30 |
| 2021/0209388 | A1 * | 7/2021 | Ciftci .................. G06N 3/08 |

FOREIGN PATENT DOCUMENTS

| | | |
|---|---|---|
| KR | 10-2015-0009184 A | 1/2015 |
| KR | 10-1746074 B1 | 6/2017 |
| KR | 10-2018-0045745 A | 5/2018 |
| KR | 10-1977802 B1 | 5/2019 |
| KR | 10-1993266 B1 | 6/2019 |

OTHER PUBLICATIONS

Wikipedia, Codec (Year: 2023).*
Marra et al, A Full-Image Full-Resolution End-to-End-Trainable CNN Framework for Image Forgery Detection, Arxiv: 1909.06751 (Year: 2019).*
Amerini et al, Proceedings of the IEEE/CVF International Conference on Computer Vision (ICCV) (Year: 2019).*
Tien-Ju Yang et al., "A Method to Estimate the Energy Consumption of Deep Neural Networks", 51st Asilomar Conference on Signals, Systems, and Computers, IEEE, Oct. 29, 2017-Nov. 1, 2017, pp. 1916-1920, 5 pages total.
Amir Erfan Eshratifar et al., "Energy and Performance Efficient Computation Offloading for Deep Neural Networks in a Mobile Cloud Computing Environment", GLSVLSI '18, 2018 Great Lakes Symposium on VLSI, May 23, 2018-May 25, 2018, 6 pages total.
Amerini, Irene et al., "Deepfake Video Detection through Optical Flow based CNN", ICCV Workshop, IEEE, Oct. 1, 2019. (3 pages total).
International Search Report (PCT/ISA/210) issued by the International Searching Authority in International Application No. PCT/KR2020/012939, dated Jan. 20, 2021.
Written Opinion (PCT/ISA/237) issued by the International Searching Authority in International Application No. PCT/KR2020/012939, dated Jan. 20, 2021.
Thanh Thi Nguyen et al., "Deep Learning for Deepfakes Creation and Detection", arXiv:1909.11573v1, Sep. 25, 2019, [retrieved on Dec. 24, 2020]. Retrieved from: <URL: https://arxiv.org/abs/1909.11573v1>, pp. 1-16 (17 pages total).
Yuezun Li et al., "Exposing DeepFake Videos by Detecting Face Warping Artifacts", arXiv:1811.00656v3, May 22, 2019, [retrieved on Dec. 24, 2020]. Retrieved from: <URL: https://arxiv.org/pdf/1811.00656v3>, pp. 1-7 (8 pages total).
Andreas Rössler et al., "FaceForensics++: Learning to Detect Manipulated Facial Images", arXiv:1901.08971v3, Aug. 26, 2019, [retrieved on Dec. 24, 2020]. Retrieved from: < URL: https://arxiv.org/abs/1901.08971v3>, pp. 1-14 (15 pages total).
Karen Simonyan et al., "Two-Stream Convolutional Networks for Action Recognition in Videos", arXiv:1406.2199v2, Nov. 12, 2014, [retrieved on Dec. 24, 2020]. Retrieved from: < URL: https://arxiv.org/abs/1406.2199v2>, pp. 1-11 (12 pages total).

* cited by examiner

ELECTRONIC APPARATUS AND CONTROLLING METHOD THEREOF

CROSS-REFERENCE TO RELATED APPLICATIONS

This application claims priority from Korean Patent Application No. 10-2020-0002257 filed in the Korean Intellectual Property Office on Jan. 7, 2020, the disclosure of which is incorporated herein by reference.

BACKGROUND

1. Field

Aspects of the exemplary embodiments relate to an electronic apparatus and a controlling method thereof and more particularly, to an electronic apparatus that detects whether one or more images have been manipulated and a controlling method thereof. That is, the electronic apparatus and controlling method may identify manipulated images (e.g., fake images).

2. Description of the Related Art

Recently, an artificial intelligence system has been used in various fields. The artificial intelligence system is a system where unlike the existing rule-based smart system, a machine learns, makes a decision and becomes smart by itself. As the artificial intelligence system is used more, the recognition rate is improved and a user's preference can be understood more accurately. Thus, the existing rule-based smart system is gradually being replaced by a deep learning-based artificial intelligence system.

An artificial intelligence technology includes machine learning (e.g., deep learning) and element technologies that utilize the machine learning.

The machine learning is an algorithm technology of classifying and learning features of input data by oneself, and the element technology is a technology of using matching learning algorithm such as deep learning to perform cognition, judgement, etc. of a human brain and includes technical fields such as linguistic understanding, visual understanding, inference/prediction, knowledge representation, a motion control, and the like. In particular, the linguistic understanding is a technology of recognizing human language/culture and applying/processing the same, and includes natural language processing, machine translation, interactive system, question and answer, speech recognition/synthesis, and the like.

Recently, image manipulation technology using artificial intelligence has been developed, and various crimes using the image manipulation technology such as distributing pornography that synthesizes faces of famous celebrities, are occurring frequently.

Accordingly, there is a need for a technology for detecting and identifying whether one or more images have been manipulated.

SUMMARY

An aspect of the present disclosure is to an electronic apparatus that identifies whether image data has been manipulated using a neural network model and providing a result of the identification to a user.

The technical problems of the present invention are not limited to the technical problems mentioned above, and other technical problems not mentioned will be clearly understood by those skilled in the art from the following description.

A controlling method of an electronic apparatus according to an embodiment includes obtaining image data including a first frame and a second image that is a subsequent image frame of the first image frame and metadata regarding the image data, obtaining information regarding a manipulated area of the first image frame by inputting the first image frame to a first neural network model, obtaining similarity between the first image frame and the second image frame based on information regarding a motion vector included in the metadata, and determining whether there is a manipulated area in the second image frame based on the information regarding a manipulated area of the first image frame and the similarity.

An electronic apparatus according to an embodiment includes a memory and a processor, and the processor is configured to obtain image data including a first frame and a second image that is a subsequent image frame of the first image frame and metadata regarding the image data, obtain information regarding a manipulated area of the first image frame by inputting the first image frame to a first neural network model, obtain similarity between the first image frame and the second image frame based on information regarding a motion vector included in the metadata, and determine whether there is a manipulated area in the second image frame based on the information regarding a manipulated area of the first image frame and the similarity.

The processor may be configured to: based on the similarity being greater than a predetermined threshold value, set a region of interest regarding the second image frame based on the manipulated area of the first image frame and the information regarding the motion vector; and determine whether there is a manipulated area in the second image frame by determining whether the set region of interest is manipulated.

The processor may be configured to: obtain first information on a manipulation probability of the region of interest being manipulated by inputting the second image frame and the information regarding the region of interest to the first neural network model; and determine whether the region of interest is manipulated based on the first information.

The processor may be configured to: based on a size of the motion vector being greater than a predetermined value, obtain second information on a manipulation probability of the second image frame by inputting the second image frame to a second neural network model; and determine whether the region of interest is manipulated based on the first information and the second information.

The processor may be configured to: based on a size of the motion vector being less than a predetermined value, obtain third information on a manipulation probability of the region of interest being manipulated by inputting the second image frame and the information regarding the region of interest to a trained third neural network model; and determine whether the region of interest is manipulated based on the first information and the third information.

The processor may be configured to: based on the similarity being less than a predetermined threshold value, determine whether there is a manipulated area in the second image frame by inputting the second image frame to the first neural network model.

The processor may be configured to: obtain similarity between the first image frame and the second image frame based on the number of motion vectors between the first image frame and the second image frame.

The problem-solving means of the present invention are not limited to the problem-solving means mentioned above, and other problem-solving means not mentioned will be clearly understood by those skilled in the art from the present disclosure and accompanying drawings.

According to various embodiments of the present disclosure, an electronic apparatus may identify whether image data is manipulated, and provide a result of the identification to a user. Accordingly, user convenience and satisfaction can be improved.

In addition, effects obtained or predicted from the embodiments of the present disclosure are disclosed directly or implicitly in the detailed description of the embodiments of the present disclosure. For example, various effects predicted according to the embodiments of the present disclosure are disclosed in the detailed description below.

A controlling method of an electronic apparatus according to an embodiment may include: obtaining image data and metadata regarding the image data, the image data comprising a first image frame and a second image frame that is subsequent to the first image frame; identifying a manipulated area of the first image frame by inputting the first image frame to a first neural network model trained to detect whether an input image or video has been manipulated; obtaining a similarity between a region of interest corresponding to the manipulated area in the first image frame and the region of interest in the second image frame based on motion vector information included in the metadata; and detecting whether there is a manipulated area in the second image frame based on the similarity between the region of interest in the first image frame and the region of interest in the second image frame.

The detecting may comprise: based on the similarity being greater than a predetermined threshold value, setting the region of interest of the second image frame based on the region of interest of the first image frame and the motion vector information; and determining whether there is the manipulated area in the second image frame by determining whether the set region of interest has been manipulated.

The detecting may comprise: obtaining first information on a manipulation probability of the region of interest of the second image frame by inputting at least the region of interest of the second image frame to the trained first neural network model; and determining whether the region of interest of the second image frame has been manipulated based on the first information.

The detecting may comprise: based on a size of a motion vector in the motion vector information being greater than a predetermined value, obtaining second information on a manipulation probability of the second image frame by inputting at least the region of interest of the second image frame to a second neural network model; and determining whether the region of interest of the second image frame has been manipulated based on the first information and the second information.

The detecting may comprise: based on a size of a motion vector in the motion vector information being less than a predetermined value, obtaining third information on a manipulation probability of the region of interest of the second image frame by inputting at least the region of interest of the second image frame to a trained third neural network model; and determining whether the region of interest of the second image frame has been manipulated based on the first information and the third information.

The detecting may comprises: based on the similarity being less than a predetermined threshold value, determining whether there is the manipulated area in the second image frame by inputting the second image frame to the first neural network model.

The obtaining the similarity may comprise obtaining the similarity between the first image frame and the second image frame based on a number of motion vectors between the first image frame and the second image frame.

The obtaining the metadata regarding the image data may include obtaining the metadata from codec information regarding the image data.

The controlling method may further comprise: based on detecting the manipulated area in the first image frame, displaying imagery indicating that the first image frame has been manipulated.

The controlling method may further comprise: based on detecting the manipulated area in the first image frame, displaying an alert.

According to an embodiment, a non-transitory computer readable medium may comprise computer executable instructions that, when executed by a processor causes the processor to perform the controlling method described above.

An electronic apparatus according to an embodiment may comprise: a memory; and a processor configured to: obtain image data and metadata regarding the image data, the image data comprising a first image frame and a second image frame that is subsequent to the first image frame; identify a manipulated area of the first image frame by inputting the first image frame to a first neural network model trained to detect whether an input image or video has been manipulated; obtain a similarity between a region of interest corresponding to the manipulated area in the first image frame and the region of interest in the second image frame based on motion vector information included in the metadata; and detect whether there is a manipulated area in the second image frame based on the similarity between the region of interest in the first image frame and the region of interest in the second image frame.

The processor may be further configured to: obtain first information on a manipulation probability of the region of interest of the second image frame by inputting at least the region of interest of the second image frame to the trained first neural network model; and determine whether the region of interest of the second image frame has been manipulated based on the first information.

The processor may be further configured to: based on a size of a motion vector in the motion vector information being greater than a predetermined value, obtain second information on a manipulation probability of the second image frame by inputting the second image frame to a second neural network model; and determine whether the region of interest has been manipulated based on the first information and the second information.

The processor may be further configured to: based on the similarity being less than a predetermined threshold value, determine whether there is the manipulated area in the second image frame by inputting at least the region of interest of the second image frame to the first neural network model.

The processor may be further configured to: obtain the similarity between the first image frame and the second image frame based on a number of motion vectors between the first image frame and the second image frame.

The electronic apparatus may further comprise a display and the processor may be further configured to: based on detecting the manipulated area in the first image frame, control the display to display imagery indicating that the first image frame has been manipulated.

The electronic apparatus may further comprise a display and the processor may be further configured to: based on detecting the manipulated area in the first image frame, control the display to display an alert.

A method according to an embodiment may comprise: obtaining a video comprising a first image frame and a second image frame that is subsequent to the first image frame in the video; obtaining codec information regarding the video; detecting a manipulated region of the first image frame by inputting the first image frame to a first neural network model trained to detect whether an input image or video has been manipulated; obtaining a similarity between the manipulated region of the first image frame and a region of interest in the second image frame that is located in the same position as the manipulated region based on analyzing the codec information; and detecting whether there is a manipulated area in the second image frame based on the similarity between the manipulated region in the first image frame and the region of interest area in the second image frame.

The method may further comprise: based on detecting the manipulated area in the first image frame, displaying imagery indicating that the first image frame has been manipulated.

DETAILED DESCRIPTION

Figure 1:
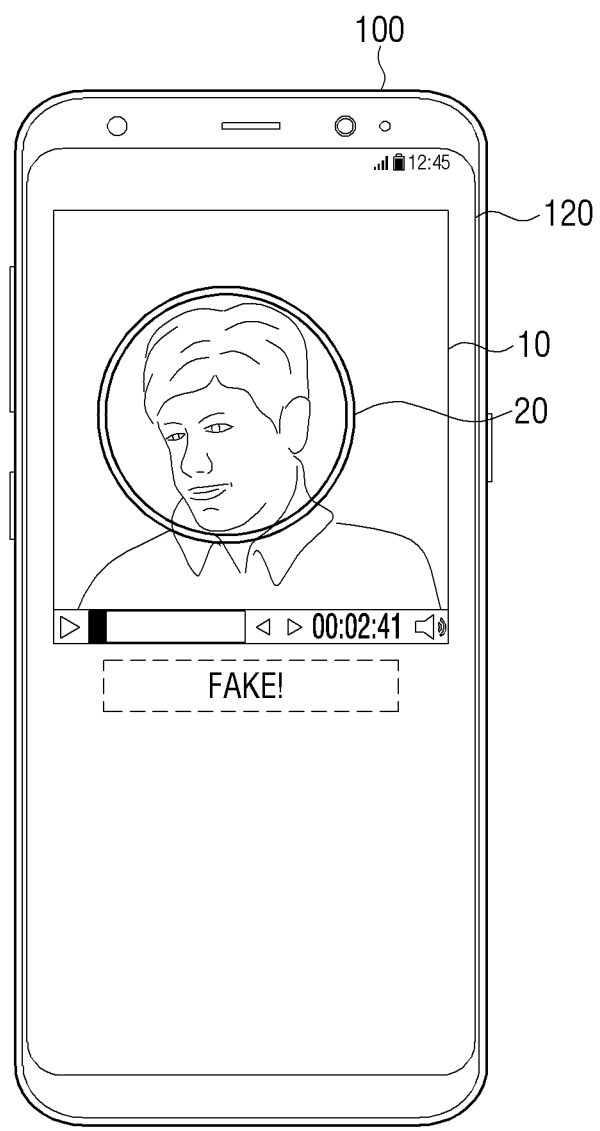
FIG. 1 is a view provided to explain an operation of an electronic apparatus according to an embodiment.

The terms used in the present disclosure are descried briefly below, and the present disclosure is described in detail below.

General terms that are currently widely used are selected as terms used in embodiments of the disclosure in consideration of functions in the disclosure, but may be changed depending on the intention of those skilled in the art or a judicial precedent, the emergence of a new technique and the like. In addition, in a specific case, terms arbitrarily chosen by an applicant may exist. In this case, the meanings of such terms are mentioned in detail in corresponding description portions of the disclosure. Therefore, the terms used in the embodiments of the disclosure need to be defined on the basis of the meanings of the terms and the contents throughout the disclosure rather than simple names of the terms.

The disclosure may be variously modified and have several embodiments, and thus specific embodiments of the disclosure are shown in the drawings and are described in detail in the detailed description. However, it is to be understood that the disclosure is not limited to specific embodiments, but includes all modifications, equivalents and substitutions without departing from the scope and spirit of the disclosure. If it is decided that a detailed description for the known art related to the disclosure may obscure the gist of the disclosure, the detailed description is omitted.

Terms 'first', 'second' and the like, may be used to describe various components, but the components are not to be construed as being limited by the terms. The terms are used only to distinguish one component from another component.

Singular forms used herein are intended to include plural forms unless explicitly indicated otherwise. It is to be understood that terms 'comprise' or 'include' used in the disclosure, specify the presence of features, numerals, steps, operations, components, parts mentioned in the present disclosure or combinations thereof, but do not preclude the presence or addition of one or more other features, numerals, steps, operations, components, parts or combinations thereof.

Hereinafter, embodiments of the disclosure are described in detail with reference to the accompanying drawings so that those skilled in the art to which the present disclosure pertains may easily practice the disclosure. However, the disclosure may be implemented in various different forms and is not limited to the embodiments described herein. In addition, in the drawings, portions unrelated to the description are omitted to obviously describe the disclosure, and similar portions are denoted by similar reference numerals throughout the disclosure.

FIG. 1 is a view provided to explain an operation of an electronic apparatus according to an embodiment.

As illustrated in FIG. 1, an electronic apparatus 100 may output image data 10 through a display 120. In this case, the image data 10 may include a manipulated area 20 having a pixel value different from a pixel value of original data. According to an embodiment, a manipulated area 20 may mean an area which has been manipulated (e.g., manipulated through image manipulation or synthesis). For example, in FIG. 1, the area corresponding to a human face may be the manipulated area 20 that has been generated through an image manipulation.

Meanwhile, the electronic apparatus 100 may identify whether there is the manipulated area 20 in the image data 10. Specifically, the electronic apparatus 100 may identify whether there is the manipulated area 20 in the image data 10 by inputting the image data 10 to a trained neural network model. In this case, the image data 10 may include a plurality of image frames. For example, the image data 10 may include a first image frame and a second image frame that is a subsequent image frame of the first image frame (i.e., subsequent to the first image frame). Meanwhile, the trained neural network model may be trained to obtain information regarding the manipulated area 20 that exists in the image data 10 by receiving the image data 10. Specifically, the neural network model may be trained to obtain information regarding the manipulated area 20 that exists in a plurality of image frames included in the image data 10. Accordingly, the electronic apparatus 100 may obtain information regarding the manipulated area 20 that exists in each of the first image frame and the second image frame by inputting the first image frame and the second image frame to the neural network model.

Meanwhile, when the electronic apparatus 100 inputs all image frames included in the image data 10 to the neural network model, the computational amount of the electronic apparatus 100 may increase excessively.

To prevent this, the electronic apparatus 100 may identify whether there is the manipulated area 20 in the second image frame based on similarity between the first image frame and the second image frame. Specifically, based on the similarity between the first image frame and the second image frame being greater than a predetermined threshold value, the electronic apparatus 100 may identify whether there is a manipulated area in the second image frame based on information regarding a manipulated area included in the first image frame. Specifically, the electronic apparatus 100 may set a region of interest (ROI) in the second image frame based on the information regarding a manipulated area included in the first image frame and metadata regarding the image data 10. In addition, the electronic apparatus 100 may identify whether there is a manipulated area in the second image frame by determining whether the set region of interest is manipulated. In other words, the electronic apparatus 100 may determine whether there is a manipulated area in the second image frame by identifying whether there is a manipulation regarding the region of interest only, not by identifying whether there is a manipulation regarding the whole area (or whole areas) of the second image frame. Accordingly, the computational amount of the electronic apparatus 100 can be reduced. Meanwhile, the metadata may include information regarding a motion vector of a plurality of image frames included in the image data 10. In addition, the electronic apparatus 100 may obtain metadata from codec information regarding the image data 10.

On the other hand, based on the similarity between the first image frame and the second image frame being less than a predetermined threshold value, the electronic apparatus 100 may identify whether there is a manipulated area in the second image frame by inputting the second image frame to a trained neural network model.

Meanwhile, the electronic apparatus 100 may output a result of identification regarding a manipulated area 20. For example, based on the manipulated area 20 that exists in the image data 10 being identified, the electronic apparatus 100 may display a text, such as the text string 'FAKE.' In addition, the electronic apparatus 100 may display information on a manipulation probability of the image data 10. Further, the electronic apparatus 100 may display the manipulated area 20 distinctively from other areas (e.g., by usage of bolding, or different colored outlining, or a boundary marking, such as a circular boundary marking as shown in FIG. 1). Through this, a user may check whether the image data 10 is manipulated. Accordingly, the user satisfaction and convenience can be improved.

Hereinafter, components of an electronic apparatus are described.

Figure 2:
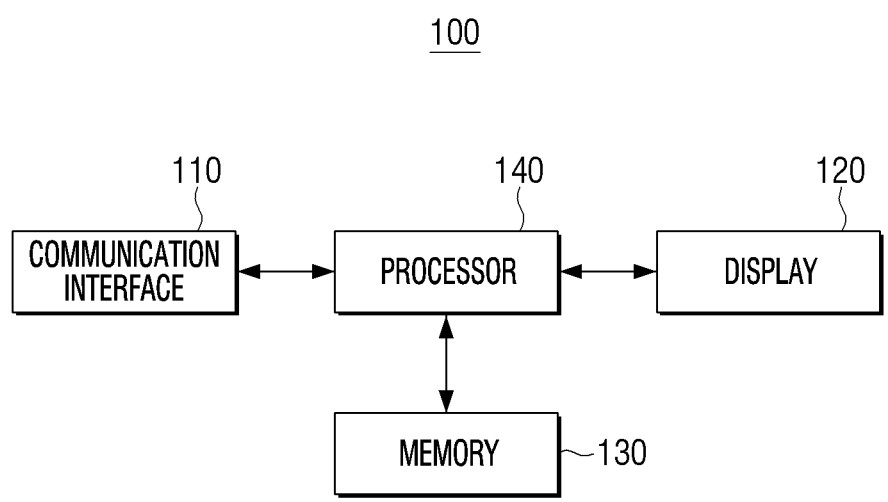
FIG. 2 is a block diagram illustrating configuration of an electronic apparatus according to an embodiment.

FIG. 2 is a block diagram illustrating configuration of an electronic apparatus according to an embodiment.

Referring to FIG. 2, the electronic apparatus 100 may include a communication interface 110, a display 120, a memory 130, and a processor 140. Meanwhile, the electronic apparatus 100 does not necessarily have to include all of the above-described components, and some components may be omitted. According to an embodiment, the electronic apparatus 100 may be implemented as a mobile device (e.g., a smartphone, etc.).

Hereinafter, each component of the electronic apparatus of FIG. 2 is described in detail. However, the electronic apparatus may include all or some of the components of FIG. 2, and the electronic apparatus may include other components beyond what is shown in FIG. 2.

The electronic apparatus 100 may include a communication interface 110, which may include at least one circuit and may perform communication with various types of external devices according to various types of communication methods. The electronic apparatus 100 may perform communication with an external server or an external device through the communication interface 110 (e.g., by controlling the communication interface to perform data communication).

When performing data communication with an external server in a wireless communication method, the communication interface 110 may include at least one of a Wireless Fidelity (WiFi) communication module, a cellular communication module, a 3rd Generation (3G) mobile communication module, a 4th Generation (4G) mobile communication module, a 4th Generation Long Term Evolution (LTE) communication module, or a 5th Generation (5G) mobile communication module. Meanwhile, the communication interface 110 may be implemented as a wireless communication module, but these are only examples. The communication interface 110 may be implemented as a wired communication module (e.g., a local area network (LAN), etc.).

The electronic apparatus 100 may include a memory 120, which may store an Operating System (OS) for controlling the overall operations of at least one of the components of the electronic apparatus 100 and commands or data related to the at least one of the components of the electronic apparatus 100. To this end, the memory 120 may be implemented as a non-volatile memory (e.g., a hard disk, a Solid state drive (SSD), a flash memory), a volatile memory, etc. In addition, the memory 120 may store a neural network model (or an object recognition model, etc.) for recognizing an object. In particular, the neural network model may be executed by the existing general-purpose processor (e.g., central processing unit (CPU)) or a separate artificial intelligence (AI)-only processor (e.g., a graphics processing unit (GPU), a neural processing unit (NPU), etc.). For example, the memory 120 may store a neural network model trained to output information regarding a fake area included in an image. In addition, the memory 120 may store an ROI setting module for setting a region of interest in an image.

The electronic apparatus 100 may include a display 120, which may be configured to display various screens. For example, the electronic apparatus 100 may output image data through the display 120. In addition, the electronic apparatus 100 may display whether the output image data has been manipulated. Meanwhile, the display 120 may be implemented as a touch screen display. In this case, the electronic apparatus 100 may obtain a user's touch input through the display 120.

The processor 140 may control the overall operations of the electronic apparatus 100.

For example, the processor 140 may obtain image data including the first image frame and the second image frame that is a subsequent image frame of the first image frame through the communication interface 110. In addition, the processor 140 may obtain metadata regarding the image data. In this case, the metadata may include information regarding a motion vector between the first image frame and the second image frame.

In addition, the processor 140 may obtain information regarding a manipulated area of the first image frame by inputting the first image frame to a trained first neural network model. In this case, the first neural network model may be an artificial intelligence model trained to detect whether an input image or video has been manipulated. For example, the first neural network model may be implemented as a deep-learning model.

In addition, the processor 140 may obtain a similarity between the first image frame and the second image frame based on information regarding a motion vector included in metadata. In this case, the processor 140 may obtain the similarity based on the number of motion vectors between the first image frame and the second image frame. Specifically, the processor 140 may determine that the more the number of motion vectors between the first image frame and the second image frame, the greater the similarity between the first image frame and the second image frame. Alternatively, the processor 140 may obtain the similarity based on the number of areas matching the first image frame from among a plurality of areas included in the second image frame. Specifically, the processor 140 may determine that the more the number of matching areas between the first image frame and the second image frame, the greater the similarity, which is described in greater detail below with reference to FIG. 4.

Meanwhile, the processor 140 may determine whether there is a manipulated area in the second image frame based on the information regarding a manipulated area of the first frame and the similarity between the first image frame and the second image frame. Specifically, based on the similarity between the first image frame and the second image frame being greater than a predetermined threshold value, the processor 140 may set a region of interest regarding the second image frame based on the information regarding a manipulated area of the first image frame and the information regarding a motion vector between the first image frame and the second image frame.

In addition, the processor 140 may determine whether there is a manipulated area in the second image frame by determining whether the set region of interest has been manipulated. In this case, the processor 140 may obtain a third image frame that is generated based on the region of interest regarding the second image frame. For example, according to an embodiment, the processor 140 may generate the third image frame based on the region of interest regarding the second image frame. For example, the third image frame may be an image frame including only a pixel value corresponding to the region of interest from among a plurality of areas of the second image frame. In addition, the processor 140 may identify whether there is a manipulated area in the third image frame by inputting the third image frame to the first neural network model. In other words, the processor 140 may determine whether there is a manipulated area in the second image frame by inputting the third image frame including information regarding the region of interest only, not the whole area (or whole areas) of the second image frame, to the first neural network model. As such, as the number of valid components of the image frame input to the first neural network model decreases, the computational amount (computational load) of the processor 140 may decrease.

Meanwhile, the processor 140 may determine whether there is a manipulated area in the second image frame based on the size of a motion vector between the first image frame and the second image frame. Specifically, based on the size of the motion vector being greater than a predetermined value, the processor 140 may obtain first information on a manipulation probability of the region of interest by inputting the third image frame to the first neural network model. In addition, the processor 140 may obtain second information on a manipulation probability for each of a plurality of areas included in the second image frame by inputting the second image frame to a second neural network model. Here, the second neural network model may be an artificial intelligence model trained to detect whether an input image or video is manipulated. For example, the second neural network model may be a deep learning model that is lighter than the first neural network model. In other words, the computational amount of the second neural network model may be smaller than that of the first neural network model. In addition, the processor 140 may determine whether the set region of interest is manipulated based on the first information and the second information. Specifically, the processor 140 may obtain fourth information based on the first information and the second information. For example, the processor 140 may obtain the fourth information by calculating the maximum value of a first probability value according to the first information and a second probability value according to the second information. In addition, the processor 140 may determine whether the set region of interest is manipulated based on whether a fourth probability value according to the fourth information is greater than a predetermined probability value, which is described below in greater detail with reference to FIG. 7.

Meanwhile, based on the size of the motion vector being less than a predetermined value, the processor 140 may obtain third information on a manipulation probability of the region of interest by inputting the second image frame to a third neural network model. Here, the third neural network model may be an artificial intelligence model trained to detect whether an input image or video is manipulated. For example, the third neural network model may be implemented as a Support Vector Machine (SVM) model. In this case, the computational amount of the third neural network model may be smaller than that of the first neural network model. The third neural network model may also have a computational amount that is smaller than the second neural network model. In addition, the processor 140 may determine whether the set region of interest is manipulated based on the first information and the third information. Specifically, the processor 140 may obtain fifth information by calculating the maximum value of the first probability value according to the first information and a third probability value according to the third information. In addition, the processor 140 may determine whether the set region of interest is manipulated based on whether a fifth probability value according to the fifth information is greater than a predetermined probability value, which is described in greater detail below with reference to FIG. 8.

Meanwhile, based on the similarity between the first image frame and the second image frame being less than a predetermined threshold value, the processor 140 may determine whether there is a manipulated area in the second image frame by inputting the second image frame to the first neural network model.

Meanwhile, the function related to artificial intelligence according to an embodiment may be operated through the processor 140 and the memory 130. The processor 140 may be implemented as one or a plurality of processors. In this case, the one processor or the plurality of processors may be a general-purpose processor such as a CPU, an access point (AP), a Digital Signal Processor (DSP), etc., a graphic-only processor such as a GPU, and a Vision Processing Unit (VPU), or an artificial intelligence (AI)-only processor such as a NPU. The one processor or the plurality of processors may perform control to process input data according to a pre-defined operation rule or an artificial intelligence model stored in the memory 130. If the one processor or the plurality of processors are an AI-only processor(s), the AI-only processor(s) may be designed in a hardware structure specialized for processing a specific artificial intelligence model.

The pre-defined operation rule or the artificial intelligence model is characterized by being created through learning. Here, being created through learning means creating a pre-defined operation rule or an artificial intelligence model that is set to perform a desired characteristic (or purpose) as a basic artificial intelligence model is trained by a learning algorithm using a plurality of learning data. Such learning may be conducted in an apparatus itself where artificial intelligence according to an embodiment is performed, or may be conducted through a separate server and/or system. The examples of the learning algorithm include supervised learning, unsupervised learning, semi-supervised learning or reinforcement learning, but are not limited thereto.

The artificial intelligence model may be composed of a plurality of neural network layers. Each of the plurality of neural network layers may have a plurality of weight values, and may perform a neural network operation through operation between a result of operation of the previous layer and the plurality of weight values. The plurality of weight values of the plurality of neural network layers may be optimized by a learning result of the artificial intelligence model. For example, the plurality of weight values may be updated so that a loss value or a cost value obtained from the artificial intelligence model during the learning process is reduced or minimized. The artificial neural network may include a Deep Neural Network (DNN) and for example, may be one or more of: a Convolutional Neural Network (CNN), a Deep Neural Network (DNN), a Recurrent Neural Network (RNN), a Generative Adversarial Network (GAN), a Restricted Boltzmann Machine (RBM), a Deep Belief Network (DBN), a Bidirectional Recurrent Deep Neural Network (BRDNN), or a Deep Q-Networks, etc. However, the artificial neural network is not limited to the above-mentioned examples.

Figure 3:
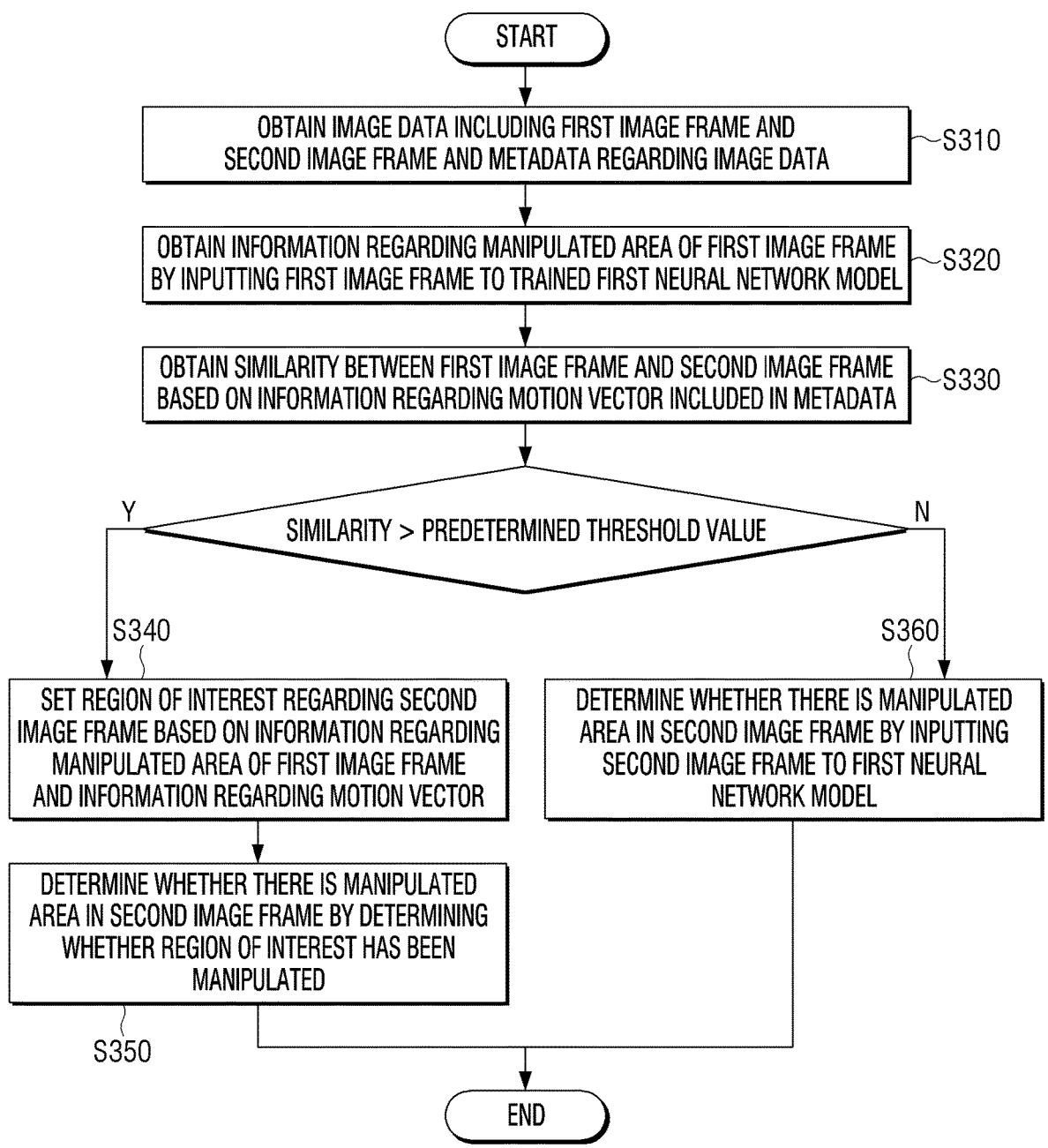
FIG. 3 is a sequence view provided to explain a controlling method of an electronic apparatus according to an embodiment.

FIG. 3 is a sequence view provided to explain a controlling method of an electronic apparatus according to an embodiment.

Referring to FIG. 3, the electronic apparatus 100 may obtain image data including the first image frame and the second image frame and metadata regarding the image data (S310). Specifically, the second image frame may be a subsequent image frame of the first image frame. In addition, the metadata may include motion vector information regarding a plurality of image frames included in the image data (e.g., the first and second image frames). The electronic apparatus 100 may obtain such motion vector information from codec information.

In addition, according to an embodiment, the electronic apparatus 100 may obtain information regarding a manipulated area of the first image frame by inputting the first image frame to the first neural network model (S320). Specifically, according to an embodiment, the first neural network model may be trained to detect whether an input image frame is manipulated. In this case, the first neural network model may output information of a manipulation probability of each of a plurality of areas included in the input image frame. For example, according to an embodiment, the electronic apparatus 100 may obtain information that the probability of the (5, 3) area of the first image frame being manipulated is 90% by inputting the first image frame to the first neural network model. Here, the plurality of areas included in the image frame may correspond to pixels of the image frame on a many-to-one basis. For example, each of the plurality of areas may have a pixel size of 16*8. However, this is only an example, and each of the plurality of areas may correspond to the number of pixels on a one-to-one basis.

Figure 4:
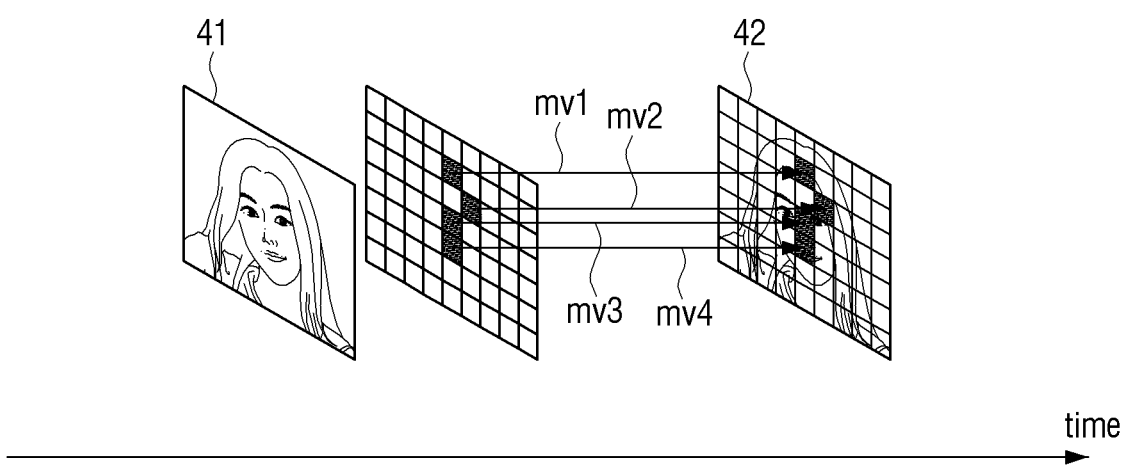
FIG. 4 is a view provided to explain a method of obtaining similarity between a first image frame and a second image frame according to an embodiment.

According to an embodiment, the electronic apparatus 100 may obtain the similarity between the first image frame and the second image frame based on information regarding the motion vector included in the metadata (S330). Specifically, according to an embodiment, the electronic apparatus 100 may obtain the similarity based on the number of motion vectors that exist between the first image frame and the second image frame. Referring to FIG. 4, according to an embodiment, there may be a plurality of motion vectors (mv1, mv2, mv3, mv4) between the first image frame (41) and the second image frame (42) that is a subsequent image frame of the first image frame (41). The electronic apparatus 100 may determine the similarity between the first image frame (41) and the second image frame (42) based on the number of motion vectors between the first image frame (41) and the second image frame (42). Specifically, the electronic apparatus 100 may determine that the more the number of motion vectors between the first image frame (41) and the second image frame (42), the greater the similarity between the first image frame (41) and the second image frame (42).

According to an embodiment, the motion vector may include location information of a source frame and location information (Ax, Ay) of a current frame in comparison with the source frame. For example, the first motion vector (mv1) may include a vector value of (0, 0). In this case, the area corresponding to (2, 5) of the first image frame 41 that is a source frame and the area corresponding to (2, 5) of the second image frame 42 may be matched with each other.

Referring to FIG. 4, for convenience of explanation, according to an embodiment, it is described that the first motion vector (mv1), the second motion vector (mv2), the third motion vector (mv3), and the fourth motion vector (mv4) have a vector value of (0,0), respectively, but this is only an example. A plurality of motion vectors may have different vectors from each other.

Figure 5:
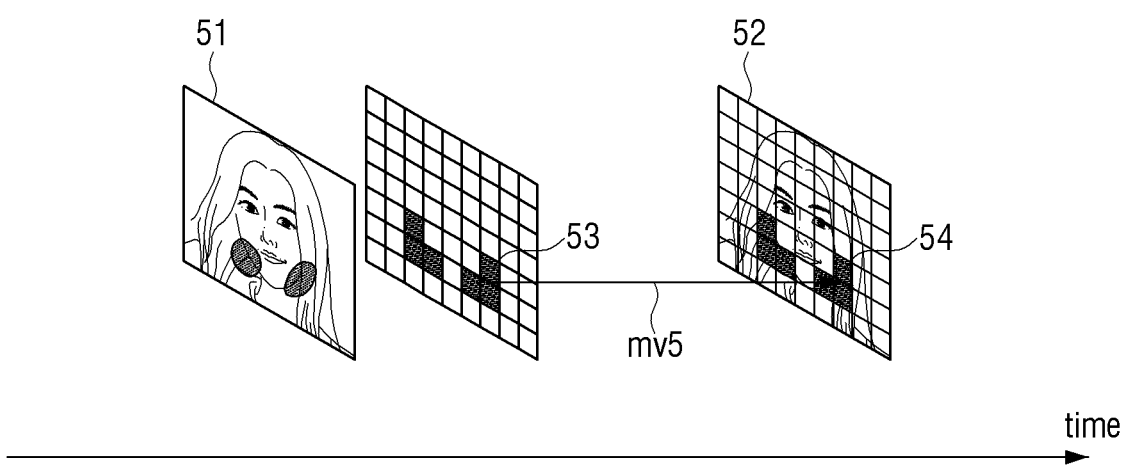
FIG. 5 is a view provided to explain a method of setting a region of interest according to an embodiment.

According to an embodiment, based on the obtained similarity being greater than a predetermined threshold value, the electronic apparatus 100 may set a region of interest regarding the second image frame based on information regarding a manipulated area of the first image frame and information regarding a motion vector (S340). Referring to FIG. 5, the fifth motion vector (mv5) may exist between the first image frame 51 and the second image frame 52. In this case, the electronic apparatus 100 may set a region of interest 54 regarding the second image frame 52 based on information regarding a manipulated area 53 of the first image frame 51 and information regarding the fifth motion vector (mv5). The manipulated area 53 of the first image frame 51 and the region of interest 54 regarding the second image frame 52 may be matched with each other.

According to an embodiment, the electronic apparatus 100 may determine (detect) whether there is a manipulation (manipulated) area in the second image frame by determining whether the region of interest set in the second image frame has been manipulated (S350).

Figure 6:
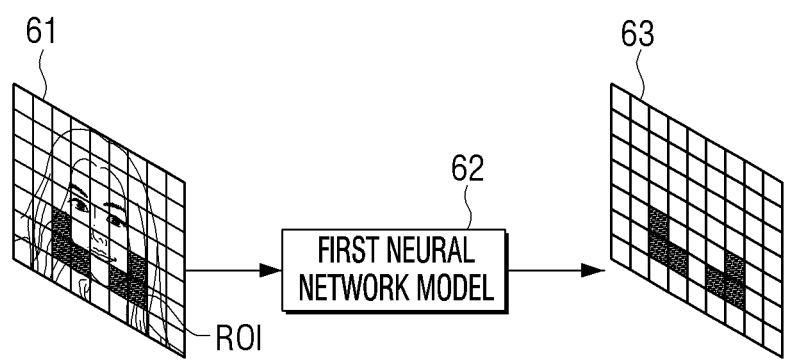
FIG. 6 is a view provided to explain a method of obtaining information on a manipulation probability of a region of interest of the second image frame according to an embodiment.

Referring to FIG. 6, according to an embodiment, the electronic apparatus 100 may determine whether the region of interest has been manipulated by inputting the second image frame 61 and information regarding the region of interest set in the second image frame 61 (e.g., location information of a pixel corresponding to the region of interest) to the first neural network model 62. In this case, the first neural network model 62 may analyze an image area corresponding to the region or interest blockwise and output information 63 corresponding to a manipulation probability for each block. For example, the information 63 regarding the manipulation probability may include a manipulation probability value for each block. Based on the manipulation probability of the region of interest being greater than a predetermined probability (e.g., 70%), the electronic apparatus 100 may determine that the region of interest has been manipulated. As such, the electronic apparatus 100 may determine whether there is a manipulated area in the second image frame 62 by determining whether there is a manipulated area only in the region of interest in the second image frame 62 (instead of by analyzing (e.g., determining whether there is a manipulated area) in the entire area of the second image frame 62). Accordingly, the computational amount of the electronic apparatus 100 may be reduced and the amount of battery consumption for computing may be reduced.

Figure 7:
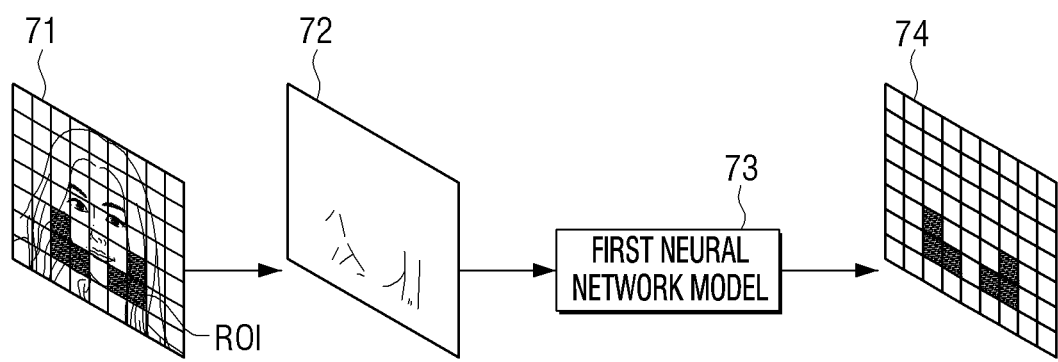
FIG. 7 is a view provided to explain a method of obtaining information on a manipulation probability of a region of interest of the second image frame according to another embodiment.

According to an embodiment, referring to FIG. 7, the electronic apparatus 100 may obtain information 74 on a manipulation probability of the region of interest by inputting a preprocessed image based on the second image frame 71 to the first neural network model 73. Specifically, the electronic apparatus 100 may obtain the third image frame 72 from the second image frame 71. In this case, the third image frame 72 may be an image frame including only a pixel value regarding the region of interest from among pixel values of the second image frame 71. In addition, the electronic apparatus 100 may obtain information regarding a manipulation probability by inputting the third image frame 72 to the first neural network model 73. As such, when the third image frame 72 including only a pixel value regarding the region of interest is input to the first neural network model 73, the computational amount of the first neural network model 73 may be reduced.

According to an embodiment, based on the obtained similarity being less than a predetermined threshold value, the electronic apparatus 100 may determine whether there is a manipulated area in the second image frame by inputting the second image frame to the first neural network model (S360). If the obtained similarity is less than a predetermined threshold value, when obtaining information regarding the second image frame based on information regarding the first image frame, the accuracy of the second image frame may be reduced. Accordingly, the electronic apparatus 100 may determine whether there is a manipulated area in the second image frame by inputting the second image frame to the first neural network model that is trained to detect a manipulated area.

Meanwhile, as described above, the electronic apparatus 100 may determine whether there is a manipulated area in the second image frame by determining whether the set region of interest in the second image frame is manipulated (S350). In this case, the electronic apparatus 100 may determine whether the region of interest is manipulated based on the size of a motion vector between the first image frame and the second image frame. Hereinafter, the above-described S350 is described in greater detail below.

Figure 8:
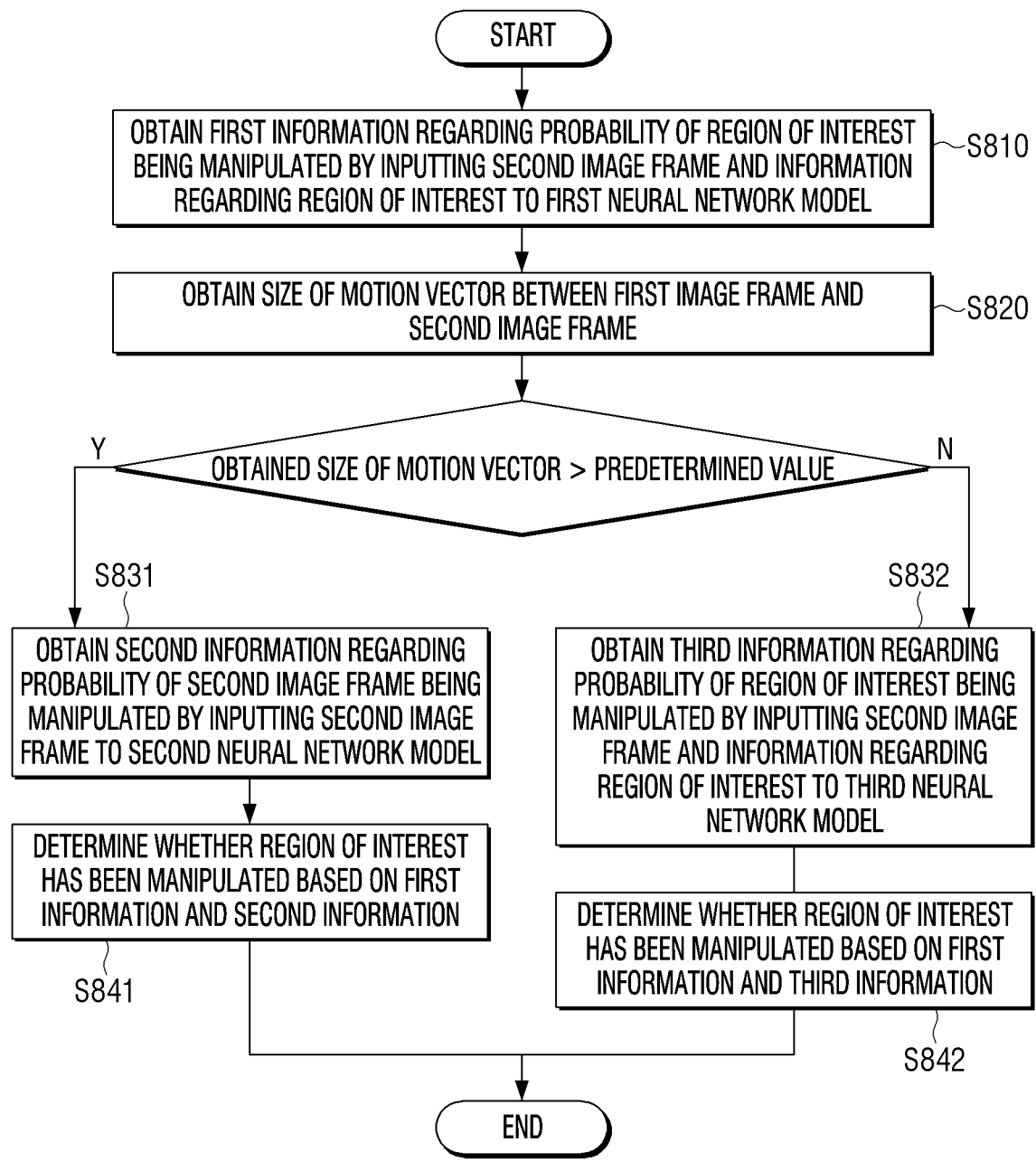
FIG. 8 is a view provided to explain a controlling method of an electronic apparatus according to an embodiment.

FIG. 8 is a view provided to explain a controlling method of an electronic apparatus according to an embodiment.

Referring to FIG. 8, the electronic apparatus 100 may obtain the first information on a manipulation probability of the region of interest by inputting the second image frame and information regarding the region of interest to the first neural network model (S810). Here, the first information may mean information 63, 73 regarding a manipulation probability described in FIGS. 6 and 7, respectively.

The electronic apparatus 100 may obtain the size of a motion vector between the first image frame and the second image frame (S820). For example, if there are a plurality of motion vectors between the first image frame and the second image frame, the electronic apparatus 100 may calculate the size of each of the plurality of motion vectors, and obtain the maximum value from among the calculated sizes of the plurality of motion vectors as the size of the final motion vector. However, a different value (e.g., an average value) of the plurality of motion vectors may be used instead.

If the obtained size of the motion vector is greater than a predetermined value, the electronic apparatus 100 may obtain the second information on a manipulation probability of the second image frame by inputting the second image frame to the second neural network model (S831). Specifically, referring to FIG. 9A, the second neural network model 95 may be an artificial intelligence model that has been trained to receive an image frame and detect a manipulated area that exists in the image frame. In addition, the second neural network model 95 may be a neural network model that has a lower computational amount and is lighter than the above-described first neural network model 92. The second neural network model may perform a similar detection function as the first neural network model. Accordingly, information regarding a manipulated area obtained through the second neural network model 92 may be less accurate than information regarding a manipulated area obtained through the first neural network model 92. On the other hand, the second neural network model 95 may process the same image faster than the first neural network model 92. For example, the second neural network model 95 may be a deep-learning model that is lighter than the first neural network model 92. Meanwhile, the second information may include manipulation probability information regarding the entire area of the second image frame.

Figure 9A:
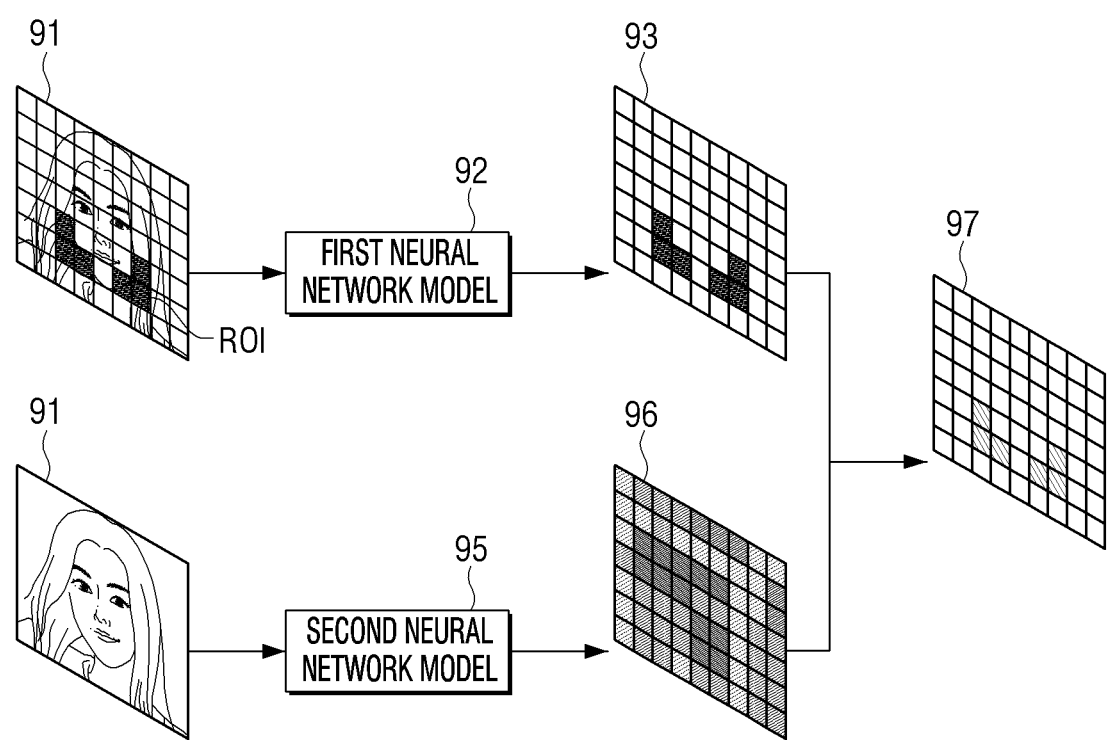
FIG. 9A is a view provided to explain a method of obtaining information on a manipulation probability of the second image frame according to an embodiment.
Figure 9B:
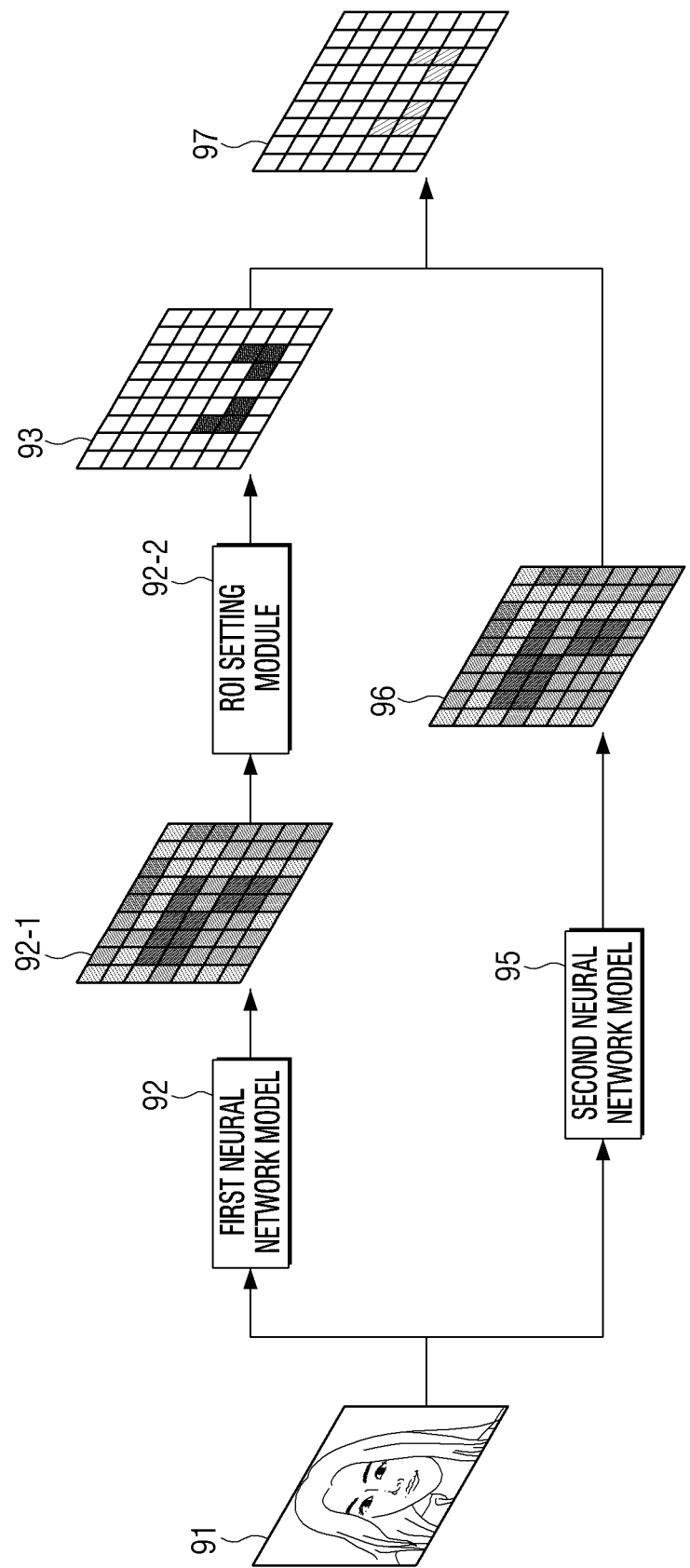
FIG. 9B is a view provided to explain a method of obtaining information on a manipulation probability of the second image frame according to an embodiment.

In addition, according to an embodiment, as described with respect to FIGS. 9A and 9B, the electronic apparatus 100 may obtain the first information 93 that is information on a manipulation probability of the region of interest by inputting the second image frame 91 and information regarding the region of interest of the second image frame 91 to the first neural network model 92. In addition, according to an embodiment, the electronic apparatus 100 may obtain the second information 96 that is information on a manipulation probability of the entire area of the second image frame 91 by inputting the second image frame 91 to the second neural network model 95. According to an embodiment, the first neural network model 92 may obtain information regarding a manipulation probability of the entire area of the second image frame 91. Referring to FIG. 9B, according to an embodiment, the electronic apparatus 100 may obtain 1-1 information 92-1 that is information on a manipulation probability of the entire area of the second image frame 91 by inputting the second image frame 91 to the first neural network model 92. In addition, the electronic apparatus 100 may obtain the first information 93 that is information on a manipulation probability of the region of interest by inputting the 1-1 information 92-1 to the ROI setting module 92-2.

According to an embodiment, the electronic apparatus 100 may determine whether the region of interest has been manipulated based on the first information 93 and the second information 96 (S841). Specifically, the electronic apparatus 100 may obtain the fourth information 97 based on the first information 93 and the second information 96. In this case, the electronic apparatus 100 may obtain the fourth information 97 by calculating a probability value of the region of interest included in the first information 93 and a maximum value of a probability value of the entire pixel area included in the second information 96. The electronic apparatus 100 may determine whether there is a manipulated area in the region of interest based on the fourth information 97. For example, the electronic apparatus 100 may determine that an area having a probability value greater than a predetermined probability value from among probability values for each area included in the fourth information 97 is a manipulated area.

According to an embodiment, based on a size of an obtained motion vector being less than a predetermined value, the electronic apparatus 100 may obtain the third information regarding a manipulation probability of the region of interest by inputting the second image frame and information regarding the region of interest to the third neural network model (S832). Here, the third neural network model may be a neural network model that is trained to detect a manipulated area included in an input image frame. In addition, the third neural network model may be an artificial intelligence model that has less computational amount and is lighter than the first neural network model. In particular, according to an embodiment, the third neural network model may be a machine-learning model that is trained to obtain information on a manipulation probability of a predetermined area (e.g., a region of interest). Further, the third neural network model may be implemented as a Support Vector Machine (SVM).

According to an embodiment, the electronic apparatus 100 may determine whether the region of interest has been manipulated based on the first information and the third information (S842).

Figure 10A:
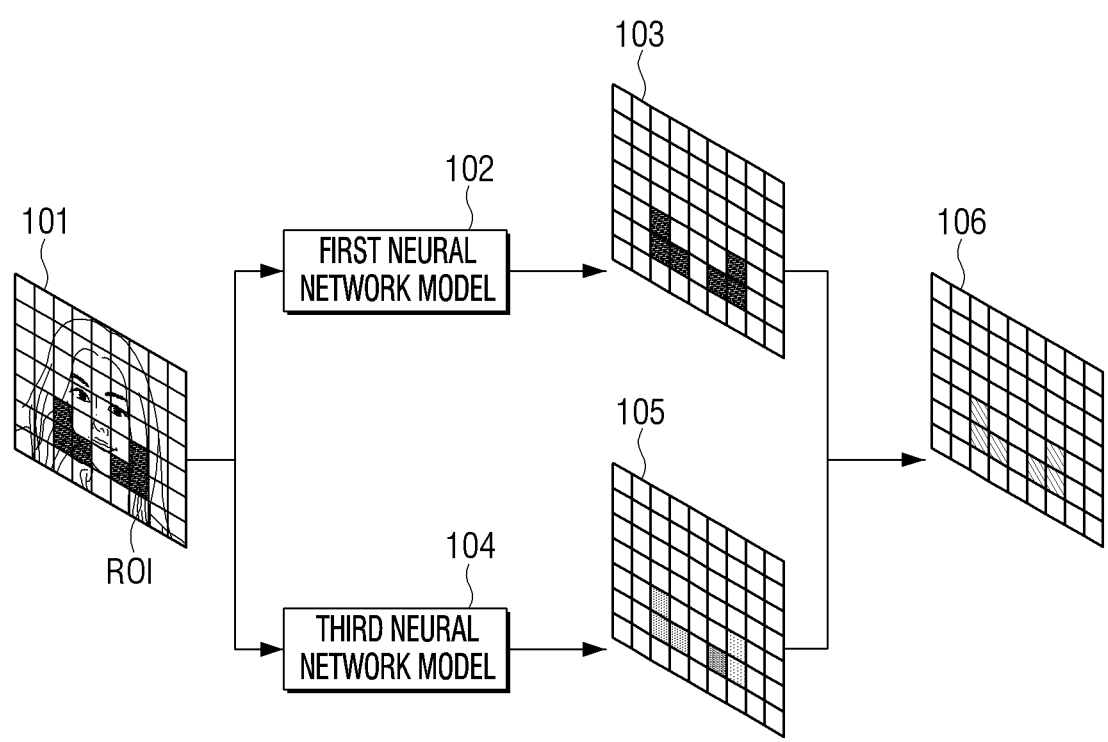
FIG. 10A is a view provided to explain a method of obtaining information on a manipulation probability of the second image frame according to an embodiment.
Figure 10B:
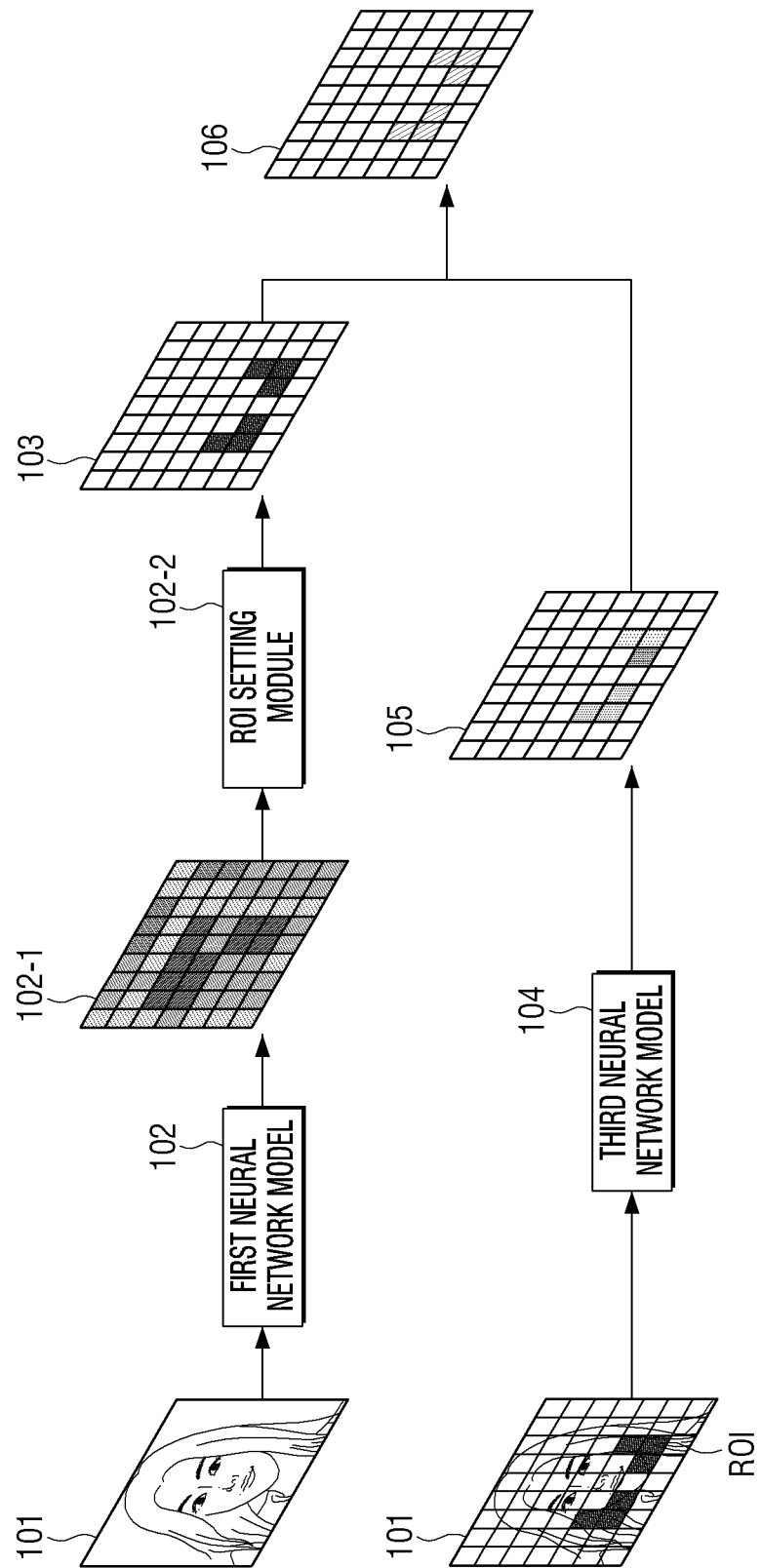
FIG. 10B is a view provided to explain a method of obtaining information on a manipulation probability of the second image frame according to an embodiment.

Specifically, referring to FIG. 10A, the electronic apparatus 100 may obtain the first information 103 by inputting the second image frame 101 and information regarding the region of interest to the first neural network model 102. In addition, the electronic apparatus 100 may obtain the third information 105 by inputting the second image frame 101 and information regarding the region of interest to the third neural network model 104. In this case, the third neural network model 104 may output information regarding a manipulation probability of the region of interest based on the information regarding the region of interest. In other words, the third neural network model 104 may output information regarding a manipulation probability of the set region of interest—not the entire area of the second image frame 101. According to an embodiment, the first neural network model 102 may obtain information regarding a manipulation probability of the entire area of the second image frame 101. Referring to FIG. 10B, according to an embodiment, the electronic apparatus 100 may obtain 1-2 information 102-1 that is information on a manipulation probability of the entire area of the second image frame 101 by inputting the second image frame 101 to the first neural network model 102. In addition, the electronic apparatus 100 may obtain the first information 103 that is information on a manipulation probability of the region of interest by inputting the 1-2 information 102-1 to the ROI setting module 102-2.

According to an embodiment, the electronic apparatus 100 may obtain the fifth information 106 based on the first information 103 and the third information 105. In this case, the first information 103, the third information 105 and the fifth information 106 may include information on a manipulation probability of the region of interest. In addition, the electronic apparatus 100 may obtain the fifth information 106 by calculating a probability value included in the first information 103 and a maximum value of a probability value included in the third information 105. In addition, the electronic apparatus 100 may determine whether there is a manipulated area in the region of interest based on the fifth information 106. For example, the electronic apparatus 100 may determine that an area having a probability value greater than a predetermined probability value from among probability values for each area included in the fifth information 106 as a manipulated area.

According to an embodiment, the diverse embodiments described above may be implemented in a computer or an apparatus similar to the computer using software, hardware, or a combination of software and hardware. In some cases, embodiments described in the disclosure may be implemented by a processor itself. According to a software implementation, embodiments such as procedures and functions described in the disclosure may be implemented by separate software modules. Each of the software modules may perform one or more functions and operations described in the disclosure.

According to an embodiment, computer instructions for performing processing operations according to the diverse embodiments of the disclosure described above may be stored in a non-transitory computer-readable medium. The computer instructions stored in the non-transitory computer-readable medium cause a specific device to perform the processing operations of the display apparatus according to the diverse embodiments described above when they are executed by a processor of the specific device.

The non-transitory computer-readable medium is not a signal medium that stores data in a transitory nature, but means a medium that semi-permanently stores data that is readable by an electronic device (e.g., a hardware processor of an electronic device). Specific examples of the non-transitory computer-readable medium may include a compact disk (CD), a digital versatile disk (DVD), a hard disk, a Blu-ray disk, a USB, a memory card, a flash drive, a ROM, and the like.

The machine-readable storage medium may be provided in a form of a non-transitory storage medium. Here, the 'non-transitory storage medium' is a tangible device and may only indicate that the device does not include a signal (e.g., electromagnetic wave). This term does not distinguish whether data are semi-permanently or temporarily stored in the storage medium. For example, the 'non-transitory storage medium' may include a buffer in which data is temporarily stored.

According to an embodiment, the methods according to the various embodiments disclosed in the disclosure may be included and provided in a computer program product. The computer program product may be traded as a product between a seller and a purchaser. The computer program product may be distributed in a form of the machine-readable storage medium (for example, a compact disc read only memory (CD-ROM)) that may be read by the machine, or distributed online (e.g. download or upload) through an application store (for example, PlayStore™) or directly between two user devices (e.g., smartphones). In the case of the online distribution, at least portions of the computer program products (e.g., downloadable app) may be at least temporarily stored or generated in the machine-readable storage medium such as a memory of a server of a manufacturer, a server of an application store or a relay server.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. A controlling method of an electronic apparatus, the controlling method comprising:
    obtaining image data and metadata regarding the image data, the image data comprising a first image frame and a second image frame that is subsequent to the first image frame;
    identifying a manipulated area of the first image frame by inputting the first image frame to a first neural network model trained to detect whether an input image or video has been manipulated;
    obtaining a similarity between the first image frame and the second image frame based on motion vector information included in the metadata; and
    detecting whether there is a manipulated area in the second image frame based on the similarity between the first image frame and the second image frame, the detecting comprising:
        based on the similarity being greater than a predetermined threshold value, setting a region of interest of the second image frame based on the manipulated area of the first image frame and the motion vector information,
        obtaining first information on a manipulation probability of the region of interest of the second image frame by inputting at least the region of interest of the second image frame to the trained first neural network model,
        based on a size of a motion vector in the motion vector information being greater than a predetermined value, obtaining second information on a manipulation probability of the second image frame by inputting at least the region of interest of the second image frame to a second neural network model, and determining whether there is a manipulated area in the second image frame by determining whether the region of interest of the second image frame has been manipulated based on the first information and the second information, and
        based on the size of the motion vector in the motion vector information being less than the predetermined value, obtaining third information on a manipulation probability of the region of interest of the second image frame by inputting at least the region of interest of the second image frame to a trained third neural network model, and determining whether there is a manipulated area in the second image frame by determining whether the region of interest of the second image frame has been manipulated based on the first information and the third information.

2. The controlling method as claimed in claim 1, wherein the detecting further comprises:
    based on the similarity being less than the predetermined threshold value, determining whether there is a manipulated area in the second image frame by inputting the second image frame to the first neural network model.

3. The controlling method as claimed in claim 1, wherein the obtaining of the similarity comprises obtaining the similarity between the first image frame and the second image frame based on a number of motion vectors between the first image frame and the second image frame.

4. The controlling method as claimed in claim 1, wherein the obtaining of the metadata regarding the image data includes obtaining the metadata from codec information regarding the image data.

5. The controlling method as claimed in claim 1, further comprising:
    based on detecting the manipulated area in the first image frame, displaying imagery indicating that the first image frame has been manipulated.

6. The controlling method as claimed in claim 1, further comprising:
    based on detecting the manipulated area in the first image frame, displaying an alert.

7. A non-transitory computer readable medium comprising computer executable instructions that, when executed by a processor causes the processor to perform the controlling method as claimed in claim 1.

8. An electronic apparatus comprising:
    a memory; and
    a processor configured to:
        obtain image data and metadata regarding the image data, the image data comprising a first image frame and a second image frame that is subsequent to the first image frame;
        identify a manipulated area of the first image frame by inputting the first image frame to a first neural network model trained to detect whether an input image or video has been manipulated;
        obtain a similarity between the first image frame and the second image frame based on motion vector information included in the metadata; and
        detect whether there is a manipulated area in the second image frame based on the similarity between the first image frame and the second image frame,
    wherein the processor is further configured to:
        based on the similarity being greater than a predetermined threshold value, setting a region of interest of the second image frame based on the manipulated area of the first image frame and the motion vector information;
        obtaining first information on a manipulation probability of the region of interest of the second image frame by inputting at least the region of interest of the second image frame to the trained first neural network model;
        based on a size of a motion vector in the motion vector information being greater than a predetermined value, obtaining second information on a manipulation probability of the second image frame by inputting at least the region of interest of the second image frame to a second neural network model, and determining whether there is a manipulated area in the second image frame by determining whether the region of interest of the second image frame has been manipulated based on the first information and the second information; and based on the size of the motion vector in the motion vector information being less than the predetermined value, obtaining third information on a manipulation probability of the region of interest of the second image frame by inputting at least the region of interest of the second image frame to a trained third neural network model, and determining whether there is a manipulated area in the second image frame by determining whether the region of interest of the second image frame has been manipulated based on the first information and the third information.

9. The electronic apparatus as claimed in claim 8, wherein the processor is further configured to:

based on the similarity being less than the predetermined threshold value, determine whether there is a manipulated area in the second image frame by inputting at least the region of interest of the second image frame to the first neural network model.

10. The electronic apparatus as claimed in claim 8, wherein the processor is further configured to:

obtain the similarity between the first image frame and the second image frame based on a number of motion vectors between the first image frame and the second image frame.

11. The electronic apparatus as claimed in claim 8, further comprising: a display, wherein the processor is further configured to: based on detecting the manipulated area in the first image frame, control the display to display imagery indicating that the first image frame has been manipulated.

12. The electronic apparatus as claimed in claim 8, further comprising: a display, wherein the processor is further configured to: based on detecting the manipulated area in the first image frame, control the display to display an alert.

* * * * *